United States Patent [19]

Breesch et al.

[11] Patent Number: 4,625,073
[45] Date of Patent: Nov. 25, 1986

[54] CABLE HAVING A BRANCH-OFF REGION SEALED WITH A BRANCH-OFF ARTICLE AND METHOD OF MAKING SAME

[75] Inventors: Louis Breesch, Cupertino, Calif.; Antonino Berrondo, Mexico City, Mexico

[73] Assignee: Raychem Corporation, Menlo Park, Calif.

[21] Appl. No.: 710,203

[22] Filed: Mar. 11, 1985

[51] Int. Cl.⁴ ..................... H02G 15/04; H02G 15/23
[52] U.S. Cl. ................................... 174/72 R; 156/49; 174/74 A; 174/77 R; 174/DIG. 8
[58] Field of Search ................. 174/21 R, 71 R, 72 R, 174/74 A, 77 R, 87, 88 R, 92, 93, DIG. 8; 156/49

[56] References Cited
U.S. PATENT DOCUMENTS 4,203,000  5/1980  Muller ........................... 174/77 R X
4,422,890  12/1983  Penneck ................... 174/DIG. 8 X
4,467,137  8/1984  Paget et al. ............... 174/DIG. 8 X

FOREIGN PATENT DOCUMENTS 1165122  3/1964  Fed. Rep. of Germany ... 174/74 A
2837896  3/1980  Fed. Rep. of Germany ... 174/DIG. 8
1242540  8/1960  France .............................. 174/74 A
2120468  11/1983  United Kingdom .................. 174/87

Primary Examiner—Laramie E. Askin
Attorney, Agent, or Firm—Dennis E. Kovach; Herbert G. Burkard

[57] ABSTRACT

A branch-off article includes a branch-off member having a body portion and at least two tubes extending from the body portion to an interior region of a splice cavity, with individual break-out members extending through the individual ones of the tubes. End portions of individual ones of the tubes are recovered and sealed to individual ones of the break-out members and the body portion is sealingly secured to a member which surrounds the splice region and the tubes.

10 Claims, 3 Drawing Figures

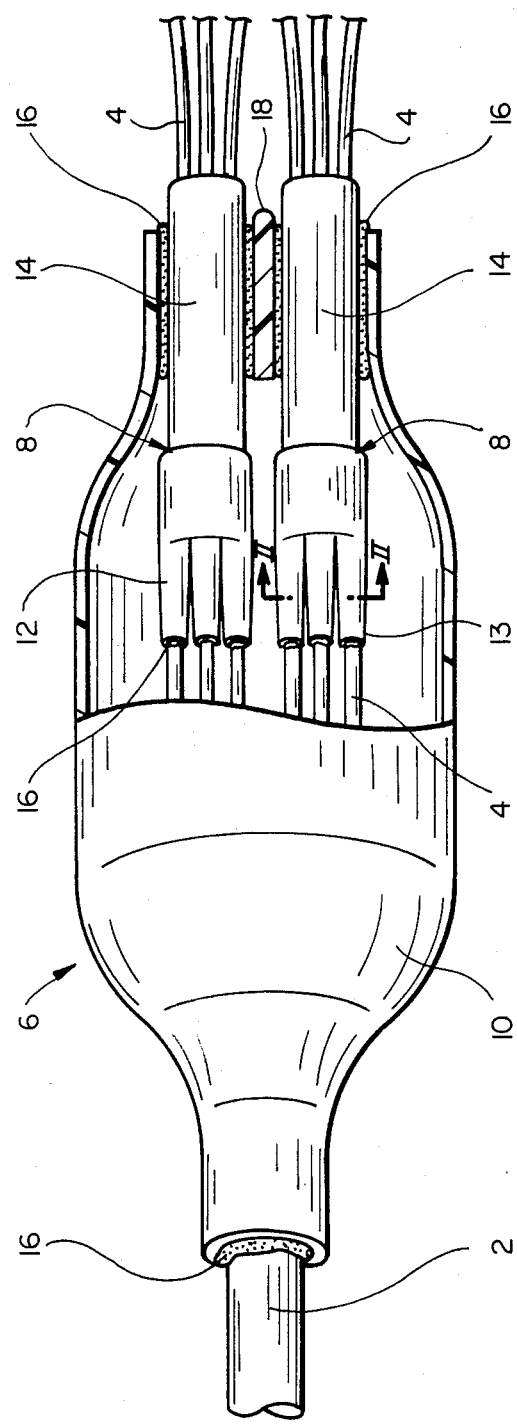
FIG_1

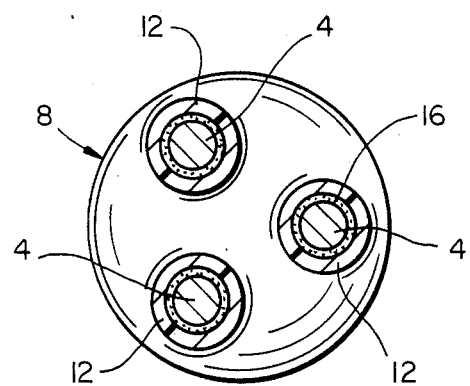
FIG_2
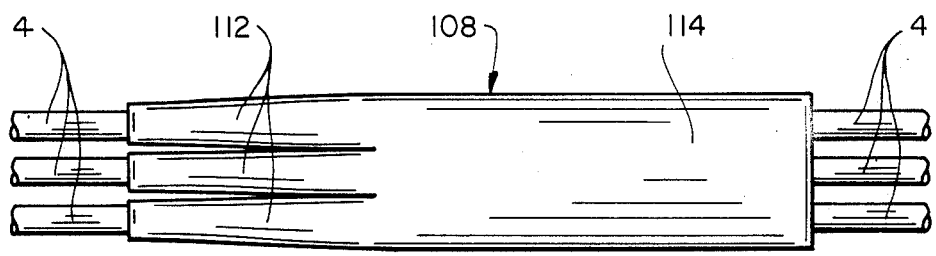
FIG_3

CABLE HAVING A BRANCH-OFF REGION SEALED WITH A BRANCH-OFF ARTICLE AND METHOD OF MAKING SAME

BACKGROUND OF THE INVENTION

1. Field of the Invention

The invention relates to a branch-off article suitable for sealing a branch-off region of a cable having a plurality of break-out members extending therefrom.

2. Description of the Prior Art

A telecommunications cable generally contains numerous individual information-carrying conductors, generally in the form of wires, which at some point are branched off from the cable, generally in groups, to form smaller cables, and eventually the wires are individually branched out as drop wires. Whenever a branch-off occurs, the branched-off drop wire or group thereof is generally referred to as a break-out member, the member also including a reduced-sized cable created downstream of a branch-off. A region where the branch-off occurs is referred to as a branch-off region.

Various methods and apparatuses have been proposed in the prior art for sealing the branch-off region, especially when the cable is pressurized, so that adverse environmental contaminants cannot enter the branch-off region. Meltsch, et al., U.S. Pat. No. 4,438,294, describes an apparatus for sealing a branch-off region wherein a liner element is received within a shrinkable tube or socket so as to form first and second conduits for accommodating first and second break-out members. A thermoplastic sealing material is utilized to enhance sealing around the break-out members. A disadvantage of this apparatus is it is craft-sensitive to assemble, and is further disadvantageous in that relatively few break-out members can be accommodated.

Thayer, et al., U.S. Pat. No. 4,343,844, describes a break-out member sealing apparatus comprising a recoverable sleeve having an intricate cell-like internal construction which defines a plurality of longitudinally extending passageways therethrough. Subsequent to inserting break-out members through the passageways, the sleeve is recovered forming a seal around the break-out members. Though this apparatus is superior to the one described by Meltsch in that a relatively large number of break-out members can be accommodated, this apparatus has a very intricate internal design and hence requires a relatively large cost to produce, and is further extremely craft-sensitive to install.

An alternative method and apparatus for branching off a plurality of break-out members from a cable is disclosed in Paget, et al., U.S. Pat. No. 4,467,137, assigned to the assignee of the present invention, the disclosure of which is incorporated herein by reference. According to this apparatus, a branch-off article includes a branch-off member which comprises a body portion and a plurality of tubes extending therefrom with the tubes being formed of a dimensionally recoverable material and being provided in an expanded state. The branch-off member is oriented such that tubes are outside an area enclosed by an outer sealing member (e.g., a recoverable sleeve), with ends of the tubes being recovered about individual ones of the break-out members extending from a splice area. Though the apparatus disclosed by Paget et al is quite effective in branching out a plurality of break-out members, if a cable to which the break-out members is connected is pressurized, the pressurization within individual ones of the break-out members tends to resist a seal formed between the break-out members and the recovered tubes.

Examples of other known branch-off articles are found in U.S. Pat. Nos. 4,350,842; 4,298,415; French Pat. No. 1,242,540; and German Auslegeschrift No. 1,165,122; each of which possesses inherent limitations relating to convenience of manufacture, convenience of use, or both.

SUMMARY OF THE INVENTION

Accordingly, it is an object of the present invention to provide an improved branch-off article capable of branching off any large number of a plurality of break-out members in such a way that pressure within a cable to which the break-out members are connected does not adversely affect a pressure seal formed with individual ones of the break-out members.

This and other objects are achieved by the provision of a branch-off member which includes a body portion and at least two tubes that extend therefrom, with the tubes having end portions remote from the body portion, a length and flexibility of each of the tubes being such that a first one of the tubes can be bent away from the others to an extent permitting the end portion thereof to be recovered about its respective break-out member without substantially recovering the end portions of the other tubes, each breakout member being received within a respective tube, such that upon recovery of the end portion thereof a pressure seal is formed between the break-out member and its respective tube, with means being disposed around the tubes so as to form a pressure seal with the body portion and so as to completely enclose the tubes. Since the tubes are disposed within an interior portion defined by the means used for surrounding the tubes, pressure within the cable connected to the break-out members exists within an interior portion of the surrounding means and also within an interior portion of the break-out members such that no substantial differential pressure therebetween exists, thus eliminating any adverse effect of the seal between the end portions of the tubes and their respective break-out members.

BRIEF DESCRIPTION OF THE DRAWINGS

FIG. 1 is a partial perspective and crosssectional view of a first preferred embodiment of the invention;

FIG. 2 is a sectional view along the lines II—II in FIG. 1; and

FIG. 3 is a perspective view of a second preferred embodiment of a branch-off article of the invention.

DESCRIPTION OF THE PREFERRED EMBODIMENTS

FIG. 1 illustrates a first preferred embodiment of the present invention, with FIG. 2 being a section taken along lines II—II. Referring to these figures, a cable 2, sometimes of the pressurized type, is connected to a plurality of breakout members 4 and is environmentally sealed by a first embodiment of a branch-off article 6 of the invention. The branch-off article 6 includes one or more branch-off members 8, the embodiment of FIG. 1 illustrating two such members 8 separated by a clip 18. The clip 18 seals a region between the branch-off members 8, and preferably is of the type described in Nolf, U.S. Pat. No. 4,298,415, assigned to the assignee of the present invention, the disclosure of which is incorporated herein by reference.

Though two branch-off members 8 are illustrated in FIG. 1, it should be realized that a single branch-off member could alternatively be used rather than the two branch-off members 8 illustrated and, if desired, any larger number of the members 8 could be utilized, with sealing therebetween preferably being accomplished by various types of clips as described in Nolf U.S. Pat. No. 4,298,415.

A member 10 surrounds tubes 12 of the branch-off members 8, the member 10 providing a pressure-tight seal with a body portion 14 of the branch-off members 8 with the aid of a heat-activatable sealant 16. The member 10 and sealant 16 form a pressure-tight seal with the body portion 14 of the branch-out members 8 and also form a pressure-tight seal with the cable 2.

The member 10 can comprise a sleeve, a tube, a tape, or equivalent substitution thereof, and preferably the member 10 is formed of a dimensionally recoverable material though this is not essential or required. In the case where the member 10 is dimensionally recoverable, a preferred embodiment is to utilize a dimensionally recoverable material which has been deformed from its original state to an expanded, unstable state which then attempts to recover to its original state by the application of heat. Such materials, generally referred to as heat-recoverable materials, are well known in the art and are formed into heat-recoverable sleeves, tubes, and tapes.

When a single branch-off member 8 is utilized, sealing with the body portion 14 thereof via the member 10 is readily accomplished; however, when more than one branchoff member 8 is utilized, such as first and second branchoff members as illustrated in FIG. 1, a preferred embodiment is to utilize the clip for sealing the region between the branch-off members, as described above.

Individual break-out members 4, such as drop wires, or groups thereof, extend through individual ones of the tubes 12 with end portions 13 of the tubes 12 being recovered about the members 4 subsequent to being extended therethrough. Preferably a heat-activatable sealant 16 is provided inside the end portions of the tubes such that upon recovery of the end portions 13 using heat, the sealant 16 melts and flows and forms a good pressureresilient bond between the end portions 13 and the break break-out members 4. This seal is substantially unaffected by the amount of pressure within the cable 2 since the pressure within a cavity 11 formed by the member 10 is substantially the same as a pressure inside the tubes 12. Each tube 12 has a length and flexibility such that any one of the tubes can be bent away from the others to an extent permitting the end portion thereof to be recovered about its respective break-out member 4 without substantially affecting the end portions 13 of the other tubes 12. Accordingly, each break-out member 4 can be individually sealed to its respective tube 12 by the application of heat without prematurely recovering the end portion 13 of any of the other tubes 12 so that an excellent seal between each break-out member 4 and its respective tube 12 and end portion 13 is formed. Furthermore, providing such a length and flexibility of the tubes 12 allows flexibility in design and installation in that an excessive number of the tubes 12 can be initially provided and left substantially unrecovered after installation of the article 6 so that, in the future, if re-entry is desired so as to form additional break-out members 4 from the cable 2, the additional breakout members 4 can be readily accommodated within the tubes 12 which are still available for accommodating break-out members.

The branch-off members 8 illustrated in FIG. 1 comprise two separate components, the body portion 14 being a relatively rigid nonrecoverable tube, preferably made from a polymeric material, with the tubes 12 having end portions 13 formed of a recoverable material, the tubes 12 being secured to the body portion 14. The body portion 14, being relatively strong, is capable of accommodating hoop stresses generated upon recovery of the member 10, especially when one or more clips 18 are provided.

Alternatively, the entire branch-off member 8 can comprise a single piece molded part, preferably formed by blow molding or similar process, such member 108 being shown in FIG. 3. In this embodiment, it is preferred to ensure that body portion 114 posssesses the requisite structural strength to form a good pressure-tight seal with the member 10 upon recovery thereof, and it is further preferred that the body portion 114 be dimensionally stable, e.g., not expanded so as to be heat-recoverable, with tubes 112 being expanded so as to be heat-recoverable, specifically, it is the end portions of the tubes 112 which are preferentially expanded so as to be heat-recoverable.

In operation, to form a pressure-tight, branch-off article using any of the embodiments described above, individual ones of the break-out members 4 are inserted through individual ones of the tubes 12, and the end portions 13 of the tubes 12 are subsequently individually recovered around the respective break-out members 4 causing a sealant on an inner surface of the end portions 13 to flow and form a good pressure-tight seal with the break-out members 4. Though the end portions 13 can be individually recovered, it is also possible that they could be recovered simultaneously, though this is not the preferred embodiment.

Subsequent to recovering the end portions 13 which are adjacent the break-out members 4, if a liner or equivalent member thereof is to be utilized, it is placed around the branch-off region of the cable 2, and subsequently the member 10 is placed around the splice region and around the liner or its equivalent thereof if utilized. In the case where the member 10 is recoverable, it is then recovered around the cable 2 and around the body portion 14 of the branch-off member 8. Since pressure-tight seals are formed between the end portions 13 of the tubes 12 and the members 4, and between the member 10 and the body portion 14, as well as between the member 10 and the cable 2, in addition to any region defined by a clip 18 when utilized, it can readily be appreciated that a good sealing branch-off article is formed.

Though the invention has been described with regard to certain preferred embodiments thereof, it can readily be appreciated that modifications thereto are possible within the realm of skill of the ordinary skilled artisan, and accordingly the invention is to be limited only by the appended claims.

What is claimed is:

1. In combination, a cable with a plurality of break-out members extending therefrom at a branch-off region and a branch-off article sealing the branch-off region, the branch-off article comprising:
at least two branch-off members each including a body portion and at least two tubes extending from the body portion, end portions of the tubes being formed of a dimensionally recoverable material and being remote from the body portion, individual ones of the break-out members extending through respective individual ones of the tubes, each tube having a length and flexibility such that a first tube can be bent away from the others to an extent permitting the end portion thereof to be recovered about its respective break-out member without substantially recovering end portions of the other tubes;

a recoverable member surrounding the tubes and forming a pressure seal with the body portions of the at least two branch-off members, the ends of the tubes being enclosed by the recoverable member; and a clip secured to the recoverable member and between the body portions of the at least two branch-off members and forming a pressure seal thereat.

2. The combination as claimed in claim 1, the recoverable member being heat-recoverable.

3. The combination as claimed in claim 2, each branch-off member including a heat-activatable sealant in a vicinity of the end portions of the tubes which forms a pressure-tight seal between the tubes and their respective break-out members upon recovery of the tubes.

4. The combination as claimed in claim 1, the branch-off members each being formed of first and second parts, the first part comprising a relatively stiff tubular member which corresponds to the body portion, with the second part comprising a recoverable polymeric material which includes at least some of the plurality of tubes, the recoverable polymeric material being secured to the tubular member.

5. The combination as claimed in claim 1, the recoverable member being selected from the group consisting of a tape, a tube, and a sleeve.

6. The combination as claimed in claim 5, the recoverable member being heat-recoverable and including a heat-activatable sealant on at least a portion of an inner surface thereof confronting the body portions for sealing with the body portions.

7. The combination as claimed in claim 1, the clip being positioned around a side edge of the recoverable member.

8. The combination as claimed in claim 7, the recoverable member having a straight longitudinal axis, one end of the recoverable member being secured to the cable, an opposite end of the recoverable member being secured to the body portions of the at least two branch-off members and the clip.

9. The combination as claimed in 8, the body portions of the at least two break-off members being parallel and offset relative to one another.

10. A method of sealing a plurality of break-out members extending from a branch-off region of a pressurized cable, comprising the steps of:

disposing the break-out members through respective tubes, end portions of each tube being formed of a dimensionally recoverable material and extending from at least two body portions and being remote thereto, each tube having a length and flexibility such that a first tube can be bent away from the others to an extent permitting the end portion thereof to be recovered about its respective break-out member without substantially recovering the end portions of the other tubes;

recovering the end portion of the first tube about its respective break-out member so as to form a seal therebetween; and surrounding the tubes with a recoverable member and a clip, the clip being disposed between the at least two body portions and being secured to the recoverable member forming a pressure seal with the body portions and the recoverable member, the end portions of the tubes being enclosed by the recoverable member and the clip.

* * * * *